US009584337B2

(12) United States Patent
Kadel et al.

(10) Patent No.: US 9,584,337 B2
(45) Date of Patent: Feb. 28, 2017

(54) METHOD AND APPARATUS FOR NETWORK AND SERVICE CONTROLLED HYBRID ACCESS

(71) Applicant: DEUTSCHE TELEKOM AG, Bonn (DE)

(72) Inventors: Gerhard Kadel, Darmstadt (DE); Josef Kraus, Dieburg (DE); Jakob Belschner, Frankfurt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/439,353

(22) PCT Filed: Sep. 23, 2013

(86) PCT No.: PCT/EP2013/069695
§ 371 (c)(1),
(2) Date: Apr. 29, 2015

(87) PCT Pub. No.: WO2014/067711
PCT Pub. Date: May 8, 2014

(65) Prior Publication Data
US 2015/0295728 A1 Oct. 15, 2015

(30) Foreign Application Priority Data
Nov. 2, 2012 (EP) .................................... 12191125

(51) Int. Cl.
*H04L 12/28* (2006.01)
*H04L 29/06* (2006.01)
*H04W 12/08* (2009.01)

(52) U.S. Cl.
CPC ...... *H04L 12/2863* (2013.01); *H04L 12/2874* (2013.01); *H04L 65/1016* (2013.01); *H04W 12/08* (2013.01); *Y02B 60/33* (2013.01)

(58) Field of Classification Search
None
See application file for complete search history.

(56) References Cited

U.S. PATENT DOCUMENTS 6,563,517 B1 * 5/2003 Bhagwat ........... G06F 17/30905
375/E7.016
8,204,051 B2 * 6/2012 Sreejith ............... H04L 12/5693
370/389

(Continued)

FOREIGN PATENT DOCUMENTS

EP         2385797 A1    11/2011
WO    WO 2009095779 A1    8/2009

*Primary Examiner* — Huy D Vu
*Assistant Examiner* — James P Duffy
(74) *Attorney, Agent, or Firm* — Leydig, Voit & Mayer, Ltd.

(57) ABSTRACT

A method for network controlled optimization of hybrid access traffic management for a residential user connected via a hybrid access home gateway, which provides at least two different network links with different technology to a core network, wherein the core network has a connection to the internet, wherein in the core network a Hybrid Access Server is located, includes: extracting by the Hybrid Access Server one or more of the following information: Network link availability, Network link utilization, Quality of Service information with respect to the services requested from the home gateway; and selecting networks links, network traffic routing, and/or service routing by the Hybrid Access Server in communication with the hybrid access home gateway and/or other components in the network.

13 Claims, 2 Drawing Sheets

(56) References Cited

U.S. PATENT DOCUMENTS

| | | | |
|---|---|---|---|
| 9,021,330 B2* | 4/2015 | Purohit | H04L 1/0057 714/758 |
| 2003/0172182 A1* | 9/2003 | Clay | H04L 69/14 709/241 |
| 2006/0056347 A1* | 3/2006 | Kwak | H04W 72/005 370/329 |
| 2012/0035424 A1 | 2/2012 | Schulte | |

* cited by examiner

METHOD AND APPARATUS FOR NETWORK AND SERVICE CONTROLLED HYBRID ACCESS

CROSS-REFERENCE TO RELATED APPLICATIONS

This application is a U.S. national phase application under U.S.C. §371 of International Application No. PCT/EP2013/069695 filed on Sep. 23, 2013 and claims benefit to European Patent Application No. EP 12191125.9 filed Nov. 2, 2012. The international application was published in English on May 8, 2014 as WO 2014/067711 A1 under PCT Article 21(2).

FIELD OF THE INVENTION

The invention relates to method or device for network controlled optimization of a hybrid access traffic management for a residential user connected via a hybrid access home gateway, which provides at least two different network links with different technology to a core network, wherein the core network has a connection to the internet, wherein in the core network a Hybrid Access Server is located, which has a connection to the to the hybrid access enabled home gateway, over the two or more network links.

BACKGROUND OF INVENTION

Internet-based services and applications are rapidly growing and are fundamental to fulfill people's needs in areas such as communication, banking, shopping, information, education and entertainment. High performance internet access solutions are an important prerequisite. Currently, in most cases residential customers use DSL technologies (such as ADSL or VDSL) for Internet access, whereas mobile customers use cellular technologies (such as GSM, UMTS or LTE).

The maximum data rates which can be provided via DSL depend on the length of the access line. For longer distances, e.g. in rural areas, in many cases only a few Mbit/s are feasible. To mitigate limitations in the access, a bonding of multiple access links can be applied. Solutions are available in particular for business customers, e.g. bonding of multiple DSL lines [1].

It is also possible to combine access links provided by different media, such as DSL and cellular access, as for example described in [2]. This "hybrid access" is technically much more challenging than the combination of multiple links of the same media, in particular due to the high dynamics of the mobile access link (e.g. in terms of available throughput or latency) and due to the completely different access and core network architectures of existing fixed and mobile networks.

A typical available solution for a "hybrid access" is sketched in FIG. 1. It consists of multiple "hybrid access clients" (e.g. residential gateways or other devices such as desktop or laptop computers) controlled by a common "hybrid access server". (For simplicity reasons in FIG. 1 only one client is depicted.) Each hybrid access client has at least two access interfaces, one for example for DSL access and another one for example for access to cellular networks (e.g. UMTS networks or LTE networks). The hybrid access server is located in the public Internet. It is the common anchor point which processes all data packets from/to the client when communicating with an applications host (e.g. a content server), e.g. located in the public Internet. The traffic between the hybrid access clients and the hybrid access server is controlled by distributed "hybrid access algorithms and protocols" which decide which part of the user traffic will be transmitted via which access medium. The traffic split can be done with different granularities, e.g. packet-wise splitting or distributing the different IP flows. In addition to the user traffic some control traffic generated by the hybrid access algorithms and protocols has to be transmitted via the different access channels. In many cases, tunnels between a hybrid access client and the hybrid access server are established over the different access channels (e.g. using OpenVPN), e.g. for security reasons.

More sophisticated solutions try to perform measurements of instantaneous channel parameters (see e.g. [4]) of the different access links and use these parameters as input for algorithms controlling the traffic flows. However, the measurements often show a low accuracy and produce additional traffic overhead.

The general drawback of the current hybrid access solutions, including solutions working above IP layer (e.g. "Multipath TCP" [3]) is that they work "over the top", that means the networks between the hybrid access client and the hybrid access server are used as unknown "clouds". Knowledge available in the access and core networks (e.g. network load, available capacity, requested or used services . . . ) is not utilized for the algorithms controlling the hybrid access. Moreover, if tunnels are used via the different links between hybrid access client and hybrid access server, it may not be possible to reach service control platforms located in the operator's core network, e.g. an IMS platform to control a "Voice over IP (VoIP)" service.

SUMMARY OF INVENTION

The invention comprises a method for network controlled optimization of the hybrid access traffic management for a residential user connected via a hybrid access home gateway, which provides at least two different network links with different technology to a core network, wherein the core network has a connection to the internet, wherein in the core network a Hybrid Access Server is located, which has a connection to the to the hybrid access enabled home gateway, over the two network links, wherein by using information available from the fixed and mobile access and aggregation networks the method comprises the steps:

extracting by the Hybrid Access Server one or more of the following information: Network link availability, Network link utilization, Quality of Service information with respect to the services requested from the home gateway, Short-term and long-term prediction of available capacity on selected network segments, progress information on performing transport tasks (e.g. based on buffer fill level at the interfaces of network nodes)

control of the following processes by the Hybrid Access Server in communication with the hybrid access home gateway and/or other components in the network based on the extracted information: activation and selection of networks links, selection of the network traffic routing, IP packet or higher layer data segment distribution to the different links and/or selection of the service routing including dynamic session or service or service category assignment to the different links. Optional it is possible to adapt the transport network characteristics or content quality: adaption of scheduling and prioritization in selected network segments, implementation of fairness or policies over the entire hybrid link, equalization of link parameters and limitation of link parameter differences by the network to achieve a more homogeneous appearance to higher network layers, adaption of content quality to the performance of the hybrid link.

In a preferred embodiment the one network link is established via a mobile network and the other via a cable connection, preferably DSL. The mobile network is preferably a GSM, GPRS, EDGE, UMTS, LTE, CDMA etc network.

To optimize the connection the cell of the mobile network link can be selected if several cells are accessible. The selection is done based on the instantaneous and/or average load of the mobile cells, to provide a maximum data rate and/or minimum response delay, wherein the selection can take into account different times of a day. In a possible approach the cell selection can be done based on a long term prediction of the daily load in the cells. This allows a daily selection principle. In reaction to very high loads or a strong demand of bandwidth the cells can also be changed in a very short reaction time.

In another embodiment the Hybrid Access Server is in communication with the hybrid access home gateway to define routes for different services provided to the end user over different links, to ensure quality demands of the services. By this approach, for example Internet communication can be performed over the wireless link, wherein streaming of video or audio can be performed over the DSL-connection. The Hybrid Access Server gets the information from different network components, within the fixed or mobile access networks, or the fixed or mobile core networks.

The different types of services requested by an end user can be determined by the hybrid access home gateway on the basis of IP-address, protocol, sockets etc.

Also the Hybrid Access Server gets its information by being connected with the mobile and fixed network components to retrieve information about the network status:

For the aggregation and core networks all involved components (especially routers, switches and similar equipment) should report about their current load situation and the current utilization of the used links. The mentioned components can be:

For LTE networks: Serving Gateway (S-GW), Packet Gateway (P-GW)

For DSL networks: Broadband Remote Access Router (BBRAR)

For UMTS and GSM networks: The Serving GPRS Support Node (SGSN) and Gateway GPRS Support Node (GGSN)

All other kinds of switches and routers

For access networks:

In case of a shared medium (e.g. wireless networks, cable TV networks): The controller of the shared medium should be report about the current load of the shared medium and about the link conditions (e.g. modulation and coding scheme) to the hybrid access clients. The controller can be:

enhanced NodeB in case of LTE

Base Station Controller (BSC) in case of GSM

Radio Network Controller (RNC) in case of UMTS

Cable Modem Termination System (CMTS) in case of a cable TV network

In case of non shared medium (e.g. DSL networks) the controller of the access link should report about the current link condition to the hybrid access clients. The controller can be:

Digital Subscriber Line Access Multiplexer (DSLAM) in case of DSL

Regarding mobile networks the requested parameters for new Operation and Management Systems are described by the following requirement specification of NGMN Alliance (R19/page 24):

http://www.ngmn.org/uploads/media/NGMN_Recommendation_on_SON_and_O_M_Requir ements.pdf Therefore it can be expected that in near future nearly all of these parameters can be used for hybrid access in the context of the solution described herein.

Also the Hybrid Access Server can be in connection to the components of the core network to retrieve information of the services used by the hybrid access home gateway and/or the QoS (Quality of Services) Classes assigned to the services. This information is typically available from IMS (IP Multimedia Subsystem) or SIP (Session Initiation Protocol) entities. In terms of IMS these are Resource and Admission Control Function (RACF) and Call Session Control Function (CSCF). Related to SIP these are Application Layer Gateway and SIP Proxy Server.

The Hybrid Access Server calculates a long term prediction of parameters of the access channels and/or short term corrective update. The long term prediction uses information collected over several months to predict the daily network demands of the end users. Furthermore the load of the network components of the core, access and mobile network can be monitored and be used to setup the connection and the selection of the cells of the hybrid access home gateway.

For example the bandwidth or the load is estimated by using performance test regularly and/or by requesting information from a mobile base station.

On the basis of this information the link in the mobile network can be changed by forcing a handover between cells, which is performed on basis of an instruction of the Hybrid Access Server to establish a load balancing with respect to different cells.

The hybrid access home gateway has in general several network connections to the home network, via Ethernet or WLAN to connect local units.

When an end user requests with a connected end user device for a different and/or additional service the Hybrid Access Server will be informed by the components in the network and can change the downlink routing as well as trigger the hybrid access home gateway to change the uplink routing over the network links specifically for the services. Also this information can be provided by the hybrid access home gateway to the Hybrid Access Server. The connection between the units can use a defined service protocol which allows an exchange of information and which allows a setup of the hybrid access home gateway, especially to setup the routing.

Another aspect of the invention is a system comprising of a Hybrid Access Server and a hybrid access home gateway configured to implement the method according to the claims.

The units have the network interfaces described above and implement the process described.

The performance, the efficiency and flexibility of hybrid access solutions can be significantly improved if information available in the access and core networks is used to optimize the hybrid access traffic control mechanisms.

Information extracted out of different parts of the networks can be out of the following categories:
- Resource availability and resource utilization as well as QoS (Quality of Service) information in the access and aggregation networks
- Information about service requests, service utilization and related QoS information available in the core networks By providing the hybrid access algorithms with this kind of information and by integrating the hybrid access server in the core network of a network operator the following advantages can be achieved:
- Provide all users (fixed access users, hybrid access users and mobile users) with optimal quality and performance by an overarching traffic management, including an overarching QoS control and prioritization
- Optimized utilization of all available resources in the networks.

DETAILED DESCRIPTION OF PREFERRED EMBODIMENTS

One example for the invention is a network controlled optimization of the hybrid access traffic management for a residential user connected via a hybrid access enabled home gateway by using the following information available from the fixed and mobile access and aggregation networks:
- From the fixed access network: Information about the DSL bit rate available for a certain residential user.
- From the mobile access network: Information about the instantaneous and average load of the mobile cells (including average load over day time) suited to cover the hybrid access enabled home gateway and about the maximum data rate possible to the dedicated residential user (depending or radio propagation conditions)

Based on this information, the hybrid access algorithm can perform the following functionality (among others):
1. Setting of optimum average distributions of traffic between the different access channels. The setting may change over day time taking into account that the load in the mobile network may be different for different times of the day. Based on known load distributions over the day also a prediction of the available capacity in the future is possible.
2. Decision to which mobile radio cell the hybrid access client will be connected: If the hybrid access client may be able to establish connections to different radio cells in the surrounding area, the cell with the lowest load shall be selected, although this cell may not provide the best radio coverage (i.e. load balancing between neighboring radio cells).

These functions are possible by incorporating information out of the networks. The overarching capacity and load management ensures for example, that there is no negative impact on the mobile users by hybrid access users.

A second example is a service controlled steering of the hybrid access mechanism. If the user for example wants to initiate a voice call then the hybrid access server will be informed by the related core network components (e.g. IMS) and decides not to split the traffic but transporting it via a single access link, e.g. the DSL connection. But if during the voice call the user may decide to initiate a second service, e.g. a video streaming, which could be advantageously transported for example via the DSL link, then the algorithm may decide to switch the voice call to the cellular link if for example the DSL link may not be able to support the voice and video service simultaneously with sufficient quality.

Figure 1:
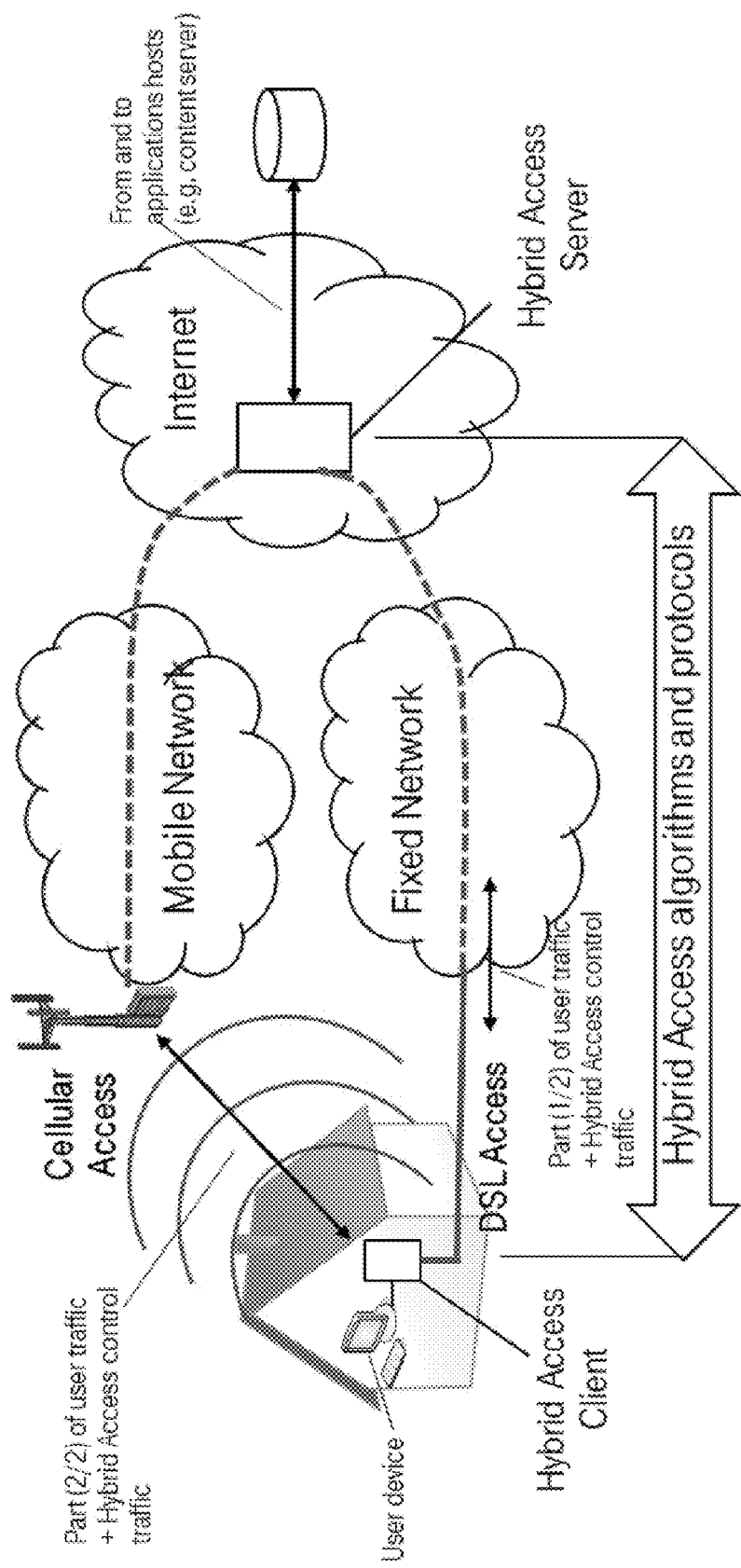
FIG. 1 shows the component of the Hybrid access network.
Figure 2:
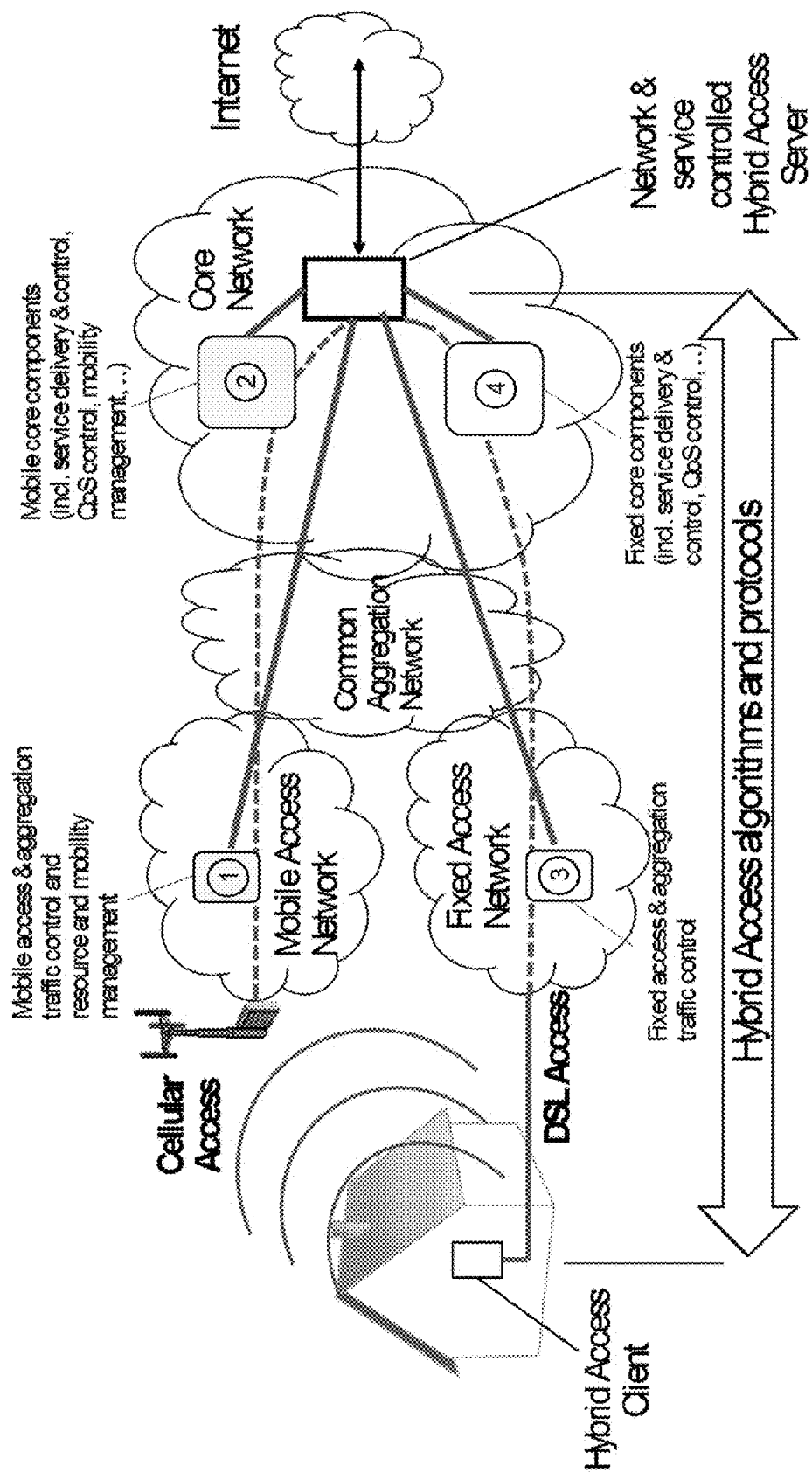
FIG. 2 shows an implementation of the Method according to the invention based on FIG. 1

In FIG. 1 and 2 the basic principle of the invention are illustrated. In contrast to previous solutions, the hybrid access server is located in the core network of a network operator and has connections to the following network entities:
1. Connection to entities in the mobile access & aggregation network performing traffic control and resource management:

At these entities information is available about the average load of the radio cells and in addition an instantaneous view on the requested resources by the users in the radio cells and resources still available in the radio cells (e.g. available in the scheduler at a mobile base station). Furthermore, the mobility management, including handovers between radio cells, is performed at these components.

2. Connection to mobile core components (incl. mobility management, service delivery & control, QoS control . . . ):

At these components information about the services used by the mobile users in the radio cells, about the QoS classes assigned to dedicated services or to different users, etc. is available. The mobility management is controlled here.

3. Connection to fixed access & aggregation traffic control:

At these entities (which can be e.g. the DSLAM) information about the maximum data rates available for the different DSL users is available 4. Connection to fixed core components (incl. service delivery & control, QoS control, resource and admission control . . . ):

At these components information about the services used by the fixed access users, about the QoS classes assigned to dedicated services or to different users and available resources for additional services is available.

For information exchange between the mentioned network entities and the hybrid access server protocols can be defined to standardize the information exchange.

With this new architecture and new methods, the following unique hybrid access functionalities can be realized:
1. Optimized network resource utilization, including:
   a. Long term prediction of parameters of the access channels (e.g. average available bandwidth, latency . . . ), complemented by short term adaptations (in particular for the mobile access channel). The short term information can be derived by two different methods:
      i. Measurement of short term parameters by methods as for example described in [4]. The drawback is that extra signaling overhead is generated
      ii. Extracting the information about requested resources by the users in the radio cells and resources still available in the radio cells out of the scheduler at a mobile base station.

The short term parameters of the access channels can be advantageously used in the hybrid access algorithm to optimize the assignment of traffic (e.g. packets or flows) to the different access channels.
    b. Load balancing between mobile radio cells: If the hybrid access client may be able to establish connections to different radio cells in the surrounding area, the cell with the lowest load shall be selected (although this cell may not provide the best radio coverage). Furthermore, a network initiated handover can be performed in order to achieve a better load distribution between the radio cells. To initiate the handover, the hybrid access server can have a connection with the mobility management function located in the mobile core network or the mobile access network.

2. Service dependent control of hybrid access, including:
    a. Determine and predict data rate requirements of used services:
        By communicating with core network components of the fixed and the mobile network the hybrid access functionality can identify the used services of the hybrid access clients.
    b. Hybrid access traffic management adapted to requirements of used service: Using the knowledge about the used services the hybrid access functionality can steer the traffic to the most suitable access channel, e.g. to use only DSL for voice services
    c. Adapt service quality to available network resources: For services with an adaptable service quality (e.g. video streams that can be delivered with different resolutions and bitrates) the hybrid access can in cooperation with other core network components adapt the service quality taking into account all existing access links to the hybrid access client.

3. -Overarching QoS control, including:
    a. prioritization of access channels depending on QoS requirements of used services and QoS agreements with users, respectively
    b. optimize resource assignment according to overall "cost" criteria ("cost" may be for example according to an optimized fulfillment of the QoS requirements of all mobile and hybrid access users, according to effort for the network operator to transmit data via a certain access channel, . . . ). This can be done on a basis per client (e.g. that first all available resources of a DSL access channel is used before additional resources from a cellular access channel are used). Additionally it possible to optimize the resource assignment for multiple hybrid access clients: As the hybrid access server can gather the information for several clients it can aim optimize the overall network usage of all hybrid access client, e.g. to provide a minimum data rate to all clients.

4. Optimization of (operator) network functionalities for hybrid access scenario.

Regarding items 1.-3. Optimization is performed in the hybrid access home gateway and the hybrid access server based on information requested from the network. In further optimization steps some network functionalities can be adapted to the hybrid access scenario.
    a. Scheduler of the mobile base station.

Currently there are different types of schedulers used to achieve a fair sharing of the base station resources. One type of scheduler distributes the resources based on equal time intervals (Round Robin). Another type of scheduler considers link quality to achieve a better fairness (Proportional fair). A new "hybrid access proportional fair scheduler" also has to take the link quality of the DSL link into account.
    b. Equalization of link parameter and limitation of link parameter differences in the transport network
        Hybrid access algorithm show very good performance if the bonded hybrid links have similar parameters e.g. regarding throughput and delay. Furthermore some higher network layers like TCP adapt permanently to these link parameters, which is more efficient if the hybrid link shows a nearly stationary behavior. Therefore, equalization of link parameter and limitation of link parameter differences can be an adequate mean to improve overall performance of the hybrid access. In "over the top" solutions hybrid access gateway and hybrid access server have only the possibility to delay or limit some traffic in one or other link which results in adjustment to the weakest link. Equalization in the transport network can additional use prioritization (e.g. in the MPLS transport network) and assignment of very high bandwidth in some network segments to compensate bottlenecks in other segments. This will result in better performance parameters of the hybrid access at expected lower cost for equalization due aggregation effects (e.g. hardware memory for data buffering is mainly unused if customer is offline).
    c. Transcoding
        Despite of using a hybrid access system by the customer some application e.g. video can show bad performance for some time. Often the perceptible quality can be improved (lower resolution is better than stuttering) if a transcoding is performed. The transcoding system and algorithm is now to be controlled by the hybrid access link quality.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LITERATURE

[1] ITU Recommendations G.998.2, Ethernet-based multi-pair bonding.
[2] EP 2375797 A1: ADSL and 3G Traffic Aggregation in Home Gateway Environment.
[3] IETF RFC 6182: Architectural Guidelines for Multipath TCP Development.
[4] Ningning Hu, Peter Steenkiste: Estimating Available Bandwidth Using Packet Pair Probing, School of Computer Science, Carnegie Mellon University, Pittsburgh, September 2002.

Acronyms

BS Base Station
CN Core Network
DSLAM Digital Subscriber Line Access Multiplexer
EPC Evolved Packet Core
GGSN Gateway GPRS Support Node
GSM Global System for Mobile Communications
IMS IP Multimedia Subsystem
LTE Long-Term Evolution
MS Mobile Station
P-GM Packet Gateway
QoS Quality of Service
RAN Radio Access Network
UMTS Universal Mobile Telecommunication System
VoIP Voice over IP

The invention claimed is:

1. A method for network controlled optimization of hybrid access traffic management for a residential user connected via a hybrid access home gateway using information available from fixed and mobile access and aggregation networks,
   wherein the hybrid access home gateway provides at least two different network links corresponding to different technologies to a core network,
   wherein the core network has a connection to the internet,
   wherein a Hybrid Access Server is located in the core network,
   wherein the Hybrid Access Server has a connection to the hybrid access home gateway via the at least two different network links,
   wherein the Hybrid Access Server is connected to mobile network core components, components of a digital subscriber line (DSL) network, and components of the core network, and
   wherein the core network, the Hybrid Access Server, the at least two different network links, the fixed and mobile access and aggregation networks, and the hybrid access home gateway are controlled by a network operator,
   wherein the method comprises:
   extracting, by the Hybrid Access Server, from the mobile network core components, information about network cells and information about occupation of the network cells;
   extracting, by the Hybrid Access Server, from the components of the core network, information of services used by the hybrid access home gateway or quality of service (QoS) classes assigned to services used by the hybrid access home gateway;
   extracting, by the Hybrid Access Server, from the components of the DSL network, information about DSL speed or workload of the components or the DSL network;
   controlling, by the Hybrid Access Server, type and number of the network cells to which the hybrid access home gateway is connected: and
   controlling, by the Hybrid Access Server, service routing for the hybrid access home gateway, including dynamic session or service category assignment for the at least two different links.

2. The method according claim 1, further comprising:
   adapting of transport network characteristics or content quality, wherein the adapting comprises one or more of the following steps: adapting of scheduling and prioritization in selected network segments, implementing of fairness or policies over a hybrid link, equalizing of link parameter and limitation of link parameter differences to achieve a more homogeneous appearance to higher network layers, and adapting of content quality to the performance of the hybrid link.

3. The method according to claim l, further comprising:
   selecting, by the Hybrid Access Server, a cell based on an instantaneous or average load of the network cells to provide a maximum data rate or minimum response delay.

4. The method according to claim 1, wherein the Hybrid Access Server in communication with the hybrid access home gateway is routing different services provided to the residential user over the at least two different network links to ensure quality demands of the services.

5. The method according to claim 4, wherein voice calls are routed over the mobile network if the DSL network is used with a streaming service.

6. The method according to claim 1, further comprising:
   calculating, by the Hybrid Access Server, a long term prediction of parameters of the access channels or short term adaption based on the extracted information.

7. The method according to claim 6, wherein a bandwidth is estimated by using or by requesting information from a mobile base station.

8. The method according to claim 1, wherein when an end user requests a different or additional service the Hybrid Access Server triggers the hybrid access home gateway to change the routing over the at least two different network links.

9. The method according to claim 1, wherein a scheduler of a mobile base station for a network link takes link quality of an other link, or a DSL link, into account.

10. The method according to claim 1, wherein bonded links are set to parameters regarding throughput and delay.

11. The method according to claim 1, further comprising:
    improving perceptible quality by performing transcoding, which is controlled by a hybrid access link quality.

12. The method according to claim 1, wherein within a link in the mobile network a handover between cells is performed based on an instruction of the Hybrid Access Server to establish a load balancing with respect to different cells.

13. A system for network controlled optimization of hybrid access traffic management for a residential user connected via a hybrid access home gateway using information available from fixed and mobile access and aggregation networks, the system comprising:
    the hybrid access home gateway; and
    a Hybrid Access Server;
    wherein the hybrid access home gateway is configured to provide at least two different network links corresponding to different technologies to a core network, wherein the core network has a connection to the internet;

wherein the Hybrid Access Server is located in the core network;
wherein the Hybrid Access Server has a connection to the hybrid access home gateway via the at least two different network links;
wherein the Hybrid Access Server is connected to mobile network core components, components of a digital subscriber line (DSL) network, and components of the core network;
wherein the core network, the Hybrid Access Server, the at least two different network links, the fixed and mobile access and aggregation networks, and the hybrid access home gateway are controlled by a network operator;
wherein the Hybrid Access Server is configured for
  extracting, from the mobile network core components, information about network cells and information about occupation of the network cells;
  extracting, from the components of the core network, information of services used by the hybrid access home gateway or quality of service (QoS) classes assigned to services used by the hybrid access home gateway;
  extracting, from the components of the DSL network, information about DSL speed or workload of the components of the DSL network;
  controlling, by the Hybrid Access Server, type and number of the network cells to which the hybrid access home gateway is connected; and
  controlling service routing for the hybrid access home gateway, including dynamic session or service category assignment for the at least two different links.

* * * * *